UNITED STATES PATENT OFFICE.

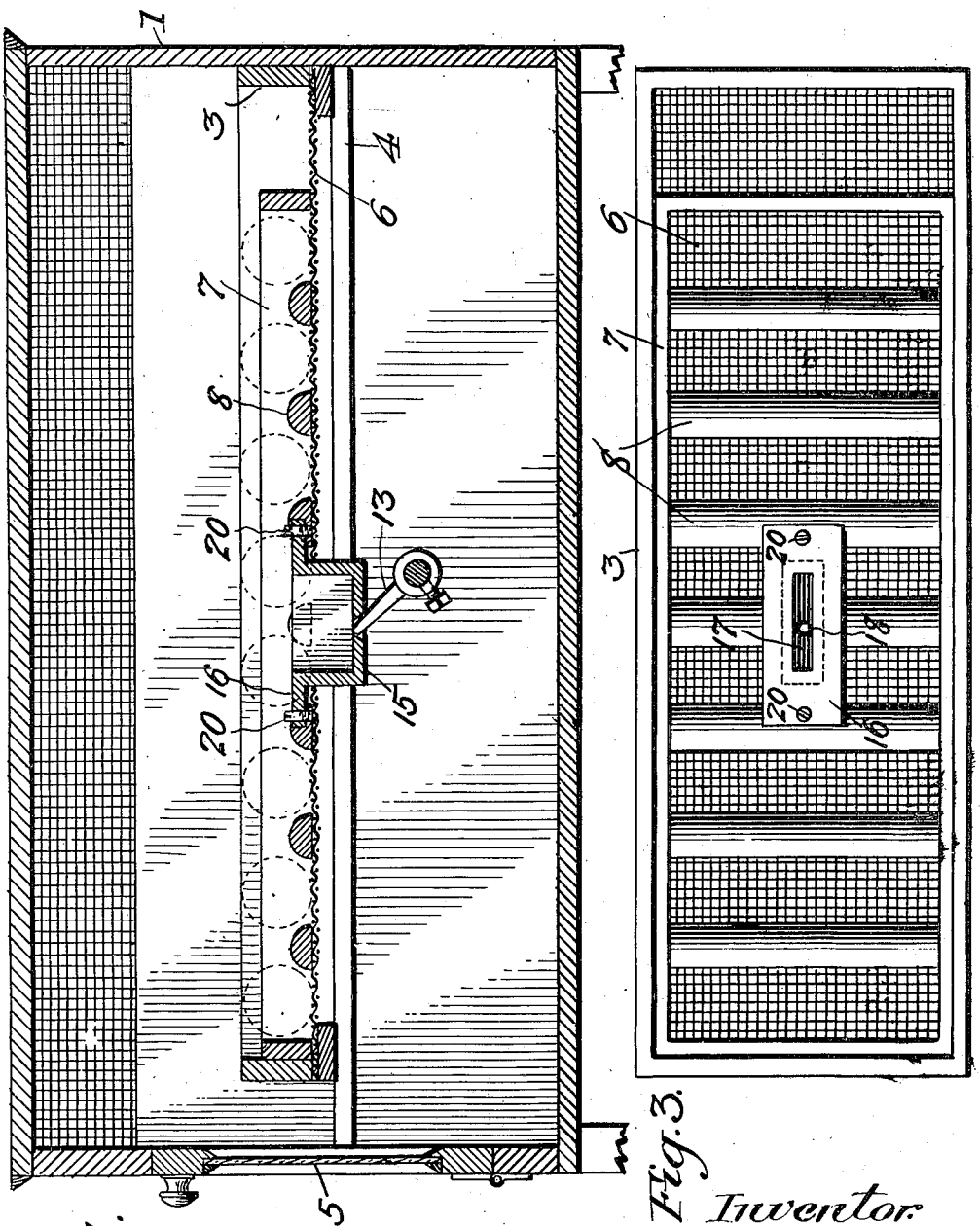

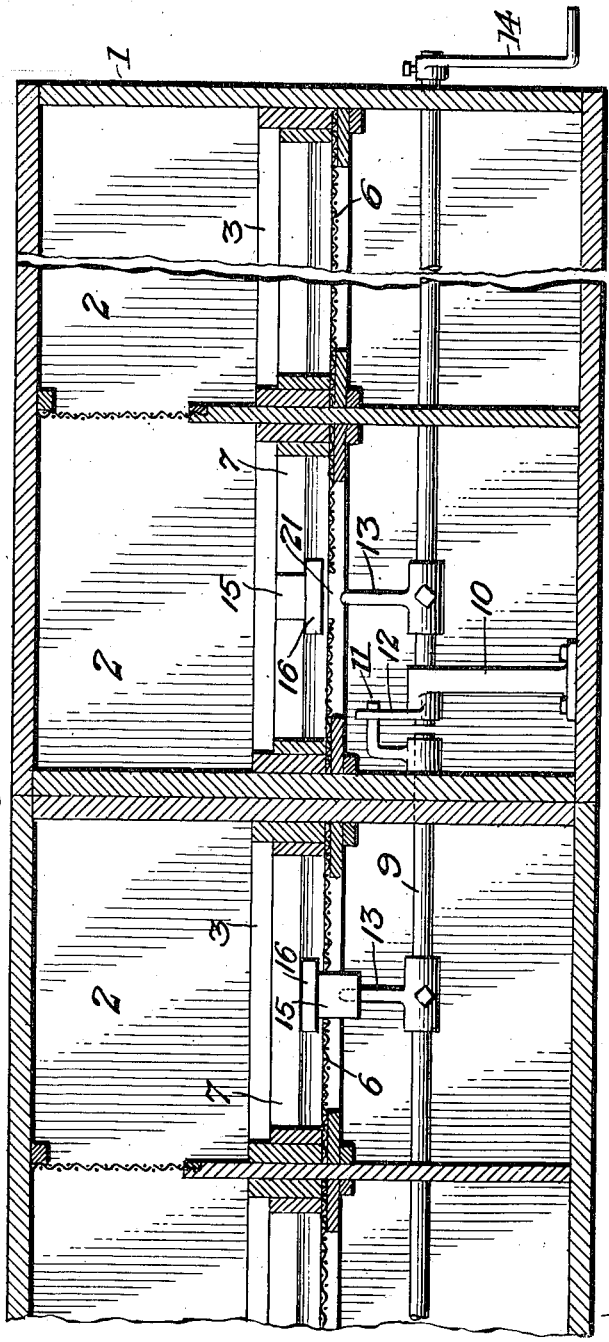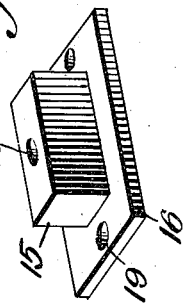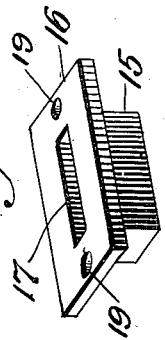

ALFRED THRUSTON POPE, OF LOUISVILLE, KENTUCKY, ASSIGNOR OF ONE-HALF TO CURRAN POPE, OF LOUISVILLE, KENTUCKY.

EGG-TURNING MECHANISM FOR INCUBATORS.

1,275,303.

Specification of Letters Patent.   Patented Aug. 13, 1918.

Application filed December 28, 1917.   Serial No. 209,339.

*To all whom it may concern:*

Be it known that I, ALFRED THRUSTON POPE, a citizen of the United States, and resident of the city of Louisville, in the county of Jefferson and State of Kentucky, have invented certain new and useful Improvements in Egg-Turning Mechanism for Incubators; and I do hereby declare the following to be a full, clear, and exact description of the invention, such as will enable others skilled in the art to which it appertains to make and use the same.

This invention relates to an egg turning mechanism for incubators.

During the period of incubation it is necessary to turn the eggs in the incubator repeatedly in order that the maximum hatching may be obtained. Furthermore, this hatching is enhanced by the reversing of the positions of the egg drawers, and the interchanging of the same, so that all of the eggs in the incubator are subjected to the same conditions.

It is an object of the present invention to provide a mechanism for actuating the egg rolling frames, which mechanism is so connected to the frames that the drawers may be reversed or withdrawn at will.

It is a further object of the invention to so construct the device that it will operate to protect the chicks which have hatched, so that injury to the chicks will be prevented.

In the drawing, in which one embodiment of my invention is illustrated,

Figure 1 is a sectional view through an incubator compartment illustrating my invention;

Fig. 2 is a sectional view taken at right angles to Fig. 1 through a plurality of compartments and illustrating two positions of the socket member;

Fig. 3 is a plan view of an egg drawer and egg rolling frame, disclosing the socket member in place on the latter;

Fig. 4 is a perspective view of the socket member, and

Fig. 5 is a similar view of the same inverted.

In the drawing I have illustrated a sectional incubator 1, which includes a plurality of compartments 2. In each of these compartments an egg drawer 3 is slidably supported on rails 4, so that it may be withdrawn from the compartment through a door 5. Each of these egg drawers consists of a rectangular frame with the usual bottom 6 of wire mesh. The egg rolling frames 7 are supported on the bottoms 6 of the egg drawers, and are shorter than the latter so that they may reciprocate therein. The frames are provided with transversely extending bars 8 between which the eggs, which are indicated in dotted lines in Fig. 1, may be placed. The reciprocation of the egg turning frames in the egg drawers will, of course, cause the rolling or turning of the eggs in the desired manner.

In order that the egg rolling frames in any or all of the egg drawers may be actuated, I have mounted a shaft 9 in suitable bearings 10 in the incubator below the egg drawers and substantially midway of their longitudinal length. This shaft 9 is made in sections, the end of one section being attached to the end of an adjacent section by a finger 11, which engages within a bifurcated element 12. The construction of this shaft is similar to that set forth in my Patent No. 1,254,273, dated Jan. 22, 1918. Secured to the shaft 9 beneath each of the egg rolling frames is an arm 13, which, when connected to the frames, causes the reciprocation of the same upon the oscillation of the shaft 9. This shaft is oscillated by means of a crank handle 14, which is secured to the end of the shaft on the exterior of the incubator.

Socket members, such as clearly illustrated in Figs. 4 and 5 are provided for the connection of the arms 13 to the egg rolling frames and for the protection of the ends of the arms during the periods when they are inoperative to cause the reciprocation of the frames. Each of these socket members comprises a hollow rectangular body portion 15, from which the flange 16 extends at right angles. The body portion is provided at one side with an elongated opening or socket 17, and at the opposite side with a restricted opening 18, the wall of which diverges outwardly, as illustrated in Fig. 1. The flange 16 of the socket member is provided with apertures 19 for a purpose which will later appear. The intermediate bars 8 of each egg rolling frame, are cut away as illustrated in Fig. 1, for the reception of the flange 16 of the socket member. This flange 16 is adapted to rest in the cutaway portions of the bars and to be held in such position by studs 20, which are screwed into the bars 8 and are adapted to extend into the apertures 19 of the flange 16. These studs 20 are of such size that the socket member may be freely removed and replaced. The bottom 6 of each egg drawer 3 is cut away as at 21 (Fig. 2), so that when the socket member is in one position the body portion 15 thereof may extend downwardly through the bottom of the egg drawer so as to engage the adjacent actuating arm 13.

When the eggs are first placed in the compartments of the incubator, the socket members are all in the position illustrated in Fig. 1 with the arms 13 engaging in the constricted openings 18. Upon the oscillation of the shaft 9, the arms 13 will, of course, be also oscillated since they are secured to the shaft and because of their engagement with the socket members and the attachment of the socket members to the egg rolling frames will cause the movement of the egg rolling frames in either one direction or the other, depending, of course, upon the direction in which the actuating crank handle is moved.

Of course, the chicks in all of the compartments of a sectional incubator will not hatch at the same time and, therefore, even after the chicks have hatched in one or more compartments it is necessary to turn the eggs in those compartments in which the chicks have not hatched. If the shaft 9 were merely actuated without disconnecting the egg rolling frames in the compartments in which the chicks have hatched, from the same, the chicks would, of course, be injured. Furthermore, even if the shaft is disconnected from these egg rolling frames, the movement of the arms 13, together with the presence of the openings 21, would cause injury to the chicks, unless the arms were properly housed and the openings properly covered. Therefore, in the compartments in which the chicks are hatching, the socket members are inverted and placed in the positions, such as illustrated at the right hand of Fig. 2. When the socket members are in this position they will, of course, be secured to the bars 8 by the studs 20, and will cover the openings 21 in the bottoms of the egg drawers. They will also protect the upper ends of the arms 13 so that all possibility of the chicks becoming injured will be obviated. It will be seen that the particular manner of connecting the actuating arms to the egg rolling frames will permit the ready removal of the drawers when it is desired to turn them end for end.

While I have illustrated and described a particular embodiment of my invention, it is to be understood that I do not wish to be limited to that embodiment, as it is obvious that many changes in the construction may be made without departing from the spirit of the invention or exceeding the scope of the claims.

What I claim is:—

1. In an incubator, the combination with an egg drawer, of an egg rolling frame operable therein, an oscillating actuating element therefor, means carried by the frame and capable of assuming two positions thereon, for connecting the oscillating element to the frame in one of its positions and for protecting the end of said oscillating element in its other position.

2. In an incubator, the combination with an egg drawer, of an egg rolling frame operable therein, an oscillating actuating member, and a connecting member carried by the frame and having two openings therein into one of which openings the actuating member is adapted to extend to form a connection between itself and the frame, and beneath the other of which the actuating member is adapted to extend so that it will be permitted to move idly and the end thereof will be protected.

3. In a sectional incubator, the combination with a plurality of egg drawers, of egg rolling frames operable therein, a shaft extending beneath the same, actuating arms carried by the shaft and extending upwardly therefrom, and socket members for connecting the actuating arms to the frames, said socket members being capable of assuming an inverted position, whereby the arms are disconnected from the frame, but the ends thereof are protected.

4. The combination with an incubator, of an egg drawer, of an egg rolling frame including transversely extending bars, said frame being operable in said drawer, a socket member having a body portion and a flange, said flange being adapted to rest on certain of the bars of the frame to support the body portion in either an upright or a depending position, and an oscillating actuating arm adapted to be connected to the body portion when the latter is in a depending position, and to be protected thereby when the body portion is in its upright position.

5. In an incubator, the combination with an egg drawer, of an egg rolling frame resting on the bottom thereof, an oscillating actuating arm located beneath the egg drawer, and a connecting member including a flange and a body portion adapted to be secured to the cross bars of the egg rolling frame so that the body portion will extend downwardly through the bottom of the egg drawer and will be actuated by the actuating arm, said connecting member being adapted to be inverted so that the actuating arm will be disconnected from the body portion, and the latter will cover the opening in the bottom of the egg drawer.

6. In an incubator, the combination with an egg drawer of an egg rolling frame operable therein, a movable actuating element therefor, means carried by the frame and capable of assuming two positions thereon, for connecting the movable element to the frame in one of its positions and for protecting the end of said movable element in its other position.

7. In an incubator, the combination with an egg drawer of an egg rolling frame operable therein, a movable actuating member, and a connecting member carried by the frame and having two openings therein into one of which openings the actuating member is adapted to extend to form a connection between itself and the frame, and beneath the other of which the actuating member is adapted to extend so that it will be permitted to move idly and the end thereof will be protected.

8. In an incubator, the combination with an egg drawer having an opening in the bottom thereof, of an egg rolling frame operable in the drawer, an actuating element located beneath the drawer, a connecting element carried by the egg rolling frame and adapted in one of its positions to extend through the opening in the bottom of the egg drawer and engage the actuating element, said connecting element being also adapted to be inverted to disconnect the actuating element and in such inverted position being arranged to cover the opening in the bottom of the egg drawer.

In testimony whereof I affix my signature.

ALFRED THRUSTON POPE.